Patented Jan. 18, 1944

2,339,249

UNITED STATES PATENT OFFICE 2,339,249

CATALYTIC TREATMENT OF HYDRO-CARBONS

Joseph D. Danforth, Chicago, Ill., assignor to Universal Oil Products Company, Chicago, Ill., a corporation of Delaware No Drawing. Application August 23, 1940,
Serial No. 353,895

8 Claims. (Cl. 196—52)

This invention relates to a process for the conversion of hydrocarbons such as petroleum fractions and hydrocarbon oils generally in the presence of powdered catalysts to produce substantial yields of hydrocarbons distilling within the gasoline boiling range and having high antiknock value. The process may be applied to conversion involving low boiling as well as high boiling hydrocarbons whether they are of natural or synthetic origin, or are produced as for example from primary distillate resulting from the destructive distillation of hydrocarbon-containing materials such as coals, lignites and shales.

The invention provides a process for converting hydrocarbon oil in a relatively simple manner in the presence of a highly-active catalyst powder. In the conventional catalytic processes, hydrocarbon oils are converted in the presence of granular catalysts disposed as beds in reaction chambers. A plurality of these catalyst chambers are provided so as to permit continuous operation, one or more chambers being in process while one or more chambers are undergoing regeneration or conditioning treatment. When cracking with catalyst powder, only a single chamber may be employed and the catalyst may be regenerated outside the reaction zone. The invention is further characterized by the catalyst which is of a refractory nature and due to its composition depresses secondary carbon and gas-forming reactions occurring during the conversion of the hydrocarbons to high antiknock gasoline. Due to the effectiveness of the catalyst, higher yields of gasoline are obtained, with greater recovery of and/or less catalyst use.

In one specific embodiment the present invention comprises mixing a refractory catalyst powder activated by boric oxide with hydrocarbon oil and cracking the mixture to produce a large yield of high antiknock gasoline, subsequently separating spent catalyst from the reaction products, regenerating the catalyst, and fractionating vaporous products to separate high boiling hydrocarbon oil boiling above the gasoline boiling range, the said high antiknock gasoline and a gaseous product.

In a further embodiment the said high boiling hydrocarbons above the gasoline boiling range are admixed with the hydrocarbon oil and catalyst powder admitted to the process for the production of further yields of said high antiknock gasoline.

According to the present invention, hydrocarbon oils, more generally of a distillate character, are catalytically cracked in the presence of synthetic hydrous oxide catalyst powders activated with boric oxide. The hydrous oxide catalyst powders may consist of boric oxide disposed on hydrated oxides such as alumina, zirconia, titania and mixtures thereof, or these oxides associated with hydrated silica. The catalytic effects are not equivalent and the proportions of the components vary for the different catalysts. Finely divided powders of alumina, titania or zirconia may be mixed or impregnated with boric oxide as for example by impregnating a precipitated and undried or uncalcined hydrous oxide of small grain size with tri-amyl borate or an alcoholic solution of boric acid, then igniting, or drying and calcining. Boric oxide is, however, preferably introduced into composites of hydrated silica with hydrated alumina and/or hydrated zirconia, the hydrated silica constituting the major proportion of the catalyst composition and the remaining components are present in minor proportions. Numerous methods may be employed in preparing the synthetic cracking catalysts which are impregnated during preparation with a boron compound subsequently yielding boric oxide. The components may be separately, concurrently or consecutively precipitated.

According to one general method of preparation, the hydrated silica may be precipitated from a dilute solution of commercial water glass and subsequently mixed with the remaining hydrous oxide components. The hydrated silica may be mixed with the hydrous oxide components in any suitable manner, as for example, by suspending the precipitated hydrated silica in a solution of a metal salt and precipitating the hydrous oxide in the presence of the suspended hydrated silica by the addition of a suitable alkaline precipitant. Various other procedures may be followed wherein these components may be co-precipitated or separately precipitated and the components intimately mixed. The hydrated silica may also be heated in solutions of the metal salts and hydrous oxides deposited in the presence of a hydrated silica by hydrolysis, or the precipitated hydrated silica may be mixed with a relatively concentrated solution of a metal salt to form a paste which is then heated to deposit the desired metal oxides. In the above procedures the catalyst may be prepared in a finely divided rather than in the gel condition by precipitating hydrated silica from an alkaline silicate solution under definitely controlled conditions in the presence of a suitable added substance such as sodium or ammonium chloride. A relatively highly dispersed precipitate of nearly colloidal dimensions is thus produced which is then mixed with the remaining hydrated oxides and yields a catalyst which is in itself more effective than catalysts of corresponding composition prepared from gels or gelatinous precipitates. These catalysts are particularly suitable for mixing or impregnating with boric oxide to increase the yield of gasoline and reduce the amount of carbon and gas formation incidental to the gasoline-forming reactions.

In the manufacture of refractory synthetic catalysts it has been found necessary where sodium compounds have been adsorbed into the catalytic material during preparation to treat the material at some stage of its preparation in order to remove these alkali metal impurities. This may be accomplished by washing with various acidic or salt solutions such as solutions of ammonium salts of strong acids or of salts of the metals of the hydrous oxides used.

Although the synthetic catalysts above described may be impregnated or mixed with the compounds of boron during preparation, these catalysts are preferably impregnated subsequent to purification and drying treatment by impregnating with a solution of a suitable boron compound or a suitable liquid boron compound. Compounds which may be used are boric acid and organic borates, for example, or other boron compounds which will form boric oxide upon decomposition. The dried silica-alumina and/or zirconia catalyst may be dipped, immersed, sprayed or otherwise treated to absorb the boron compound while in a liquid condition. The impregnated catalyst is then heated or ignited for example whereby the solvent may be driven off and recovered while the impregnated boron compound is decomposed to produce boric oxide. Thus, a solution of boric acid in methyl alcohol or triamyl borate may be absorbed upon a synthetically prepared cracking catalyst which is subsequently heated or ignited to remove the liquid and form boric oxide in and on the surfaces of the cracking catalyst. A large number of organic compounds may be used such as dibutyl borate, triethyl boron, boron trimethyl, fluo-boric acid, etc., either as liquids or in organic solvents. Similarly, boric acid may be used and any suitable solvent may be employed including water. Alcoholic solutions are particularly desirable but the practice is not restricted thereto since glycerine has been employed with good results. Other polyhydroxy alcohols such as ethylene glycol may be used as well as triethanol amines. The concentration of boric oxide on the catalyst surfaces may be controlled by varying the concentration and amount of the solutions of the impregnated boron compound used. In the formation of the boric oxide on the catalyst surfaces, the impregnating boron compound may be decomposed in any desired manner. In the case of triamyl borate the catalyst may be ignited or it may be hydrolyzed in a current of air for example, the ignition procedure being preferable. Catalysts of this type containing approximately 2 to 8% of boric oxide by weight of the catalyst generally give good results but higher proportions of the boric oxide up to 15% or more may be employed.

Various types of hydrocarbon conversion reactions take place in the presence of the powder catalyst depending partly upon the temperature, pressure and time conditions and partly upon the nature of the hydrocarbon oil processed. These reactions may include carbon to carbon cleavage, isomerization, cyclization, dehydrogenation, hydrogenation and desulfurization reactions. In the case of higher boiling hydrocarbons, for example, there is a cleavage of long-chained carbon-to-carbon bonds. Isomerization reactions may occur whereby the lower boiling hydrocarbons formed tend to become more branch chained. Also, hydro-aromatic hydrocarbons present in the oil undergoing decomposition or formed therein by cyclization of olefins may undergo dehydrogenation to form aromatic hydrocarbons, and hydrogen liberated in these reactions may combine with other olefins present during reaction to form paraffinic hydrocarbons. The later reactions tend to occur at the lower temperatures given in the range of operating conditions whereas more unsaturated hydrocarbons, particularly olefins are produced at the higher temperatures employed. The hydrocarbons produced are generally of a more branched chain structure than are those produced in thermal cracking treatment. The temperatures employed may be a temperature from about 700° F. to about 1150° F. and the pressure employed may be from about atmospheric to about 300 pounds per square inch.

The following specific examples are given to illustrate specific applications of the process of the invention, the method of catalyst preparation also being indicated. The invention should not be considered as limited to these examples of the process or to the particular catalyst preparation since these are given merely as illustrations of the novelty and utility of the invention.

Example I

A catalyst having the approximate composition of $100SiO_2:5Al_2O_3:5B_2O_3$ is prepared as follows: A commercial sample of water glass of approximately 41° Baumé gravity and containing approximately 28.5% $SiO_2$ and 8.9% $Na_2O$ is diluted approximately 10 times with water containing dissolved sodium chloride in an amount equal to approximately one-half of the weight of the water glass. Hydrochloric acid is added to the water glass-sodium chloride solution while agitating thoroughly and a very finely divided precipitate begins to form and remains in suspension in the alkaline solution. The addition of acid is continued until there is an excess of acid, the pH being approximately 3. The excess acid may then be substantially neutralized by the addition of ammonium hydroxide whereupon the hydrated silica is practically all precipitated. The hydrated silica is filtered and water washed. The washed hydrated silica is suspended in an aluminum chloride solution, in an amount suitable to form catalyst of the above composition, and hydrated alumina precipitated in the presence of the suspended finely divided hydrated silica by the addition of ammonium hydroxide. The composite precipitate is filtered and the filter cake is washed with water acidulated with hydrochloric acid until the precipitate is substantially free from sodium. The purified precipitate is dried at approximately 200–250° F. The dried material is then impregnated with an alcoholic solution of boric acid in sufficient amount to deposit approximately 5 mols of $B_2O_3$ per 100 mols of $SiO_2$ on the catalyst. The boric oxide is deposited by heating to distill out and recover the methyl alcohol thereupon depositing the boric oxide. The impregnated material readily breaks up into a very finely divided powder which is mixed with the hydrocarbon oil for cracking according to the present process.

Catalyst prepared in the above manner is mixed to the extent of one per cent by weight with a Pennsylvania distillate oil of approximately 35° A. P. I. gravity and gives a yield of 34 volume per cent of 400° F. end-point gasoline of 78 octane number in a once-through operation when heating to a temperature of approximately 975° F. and completing the reaction in a reaction chamber at a temperature of approximately 820° F. under a pressure of approximately 50 pounds per square inch. This yield is increased in a recycle operation where partly converted hydrocarbons of high boiling point range are returned in admixture with the oil undergoing cracking treatment to produce approximately 60 per cent of 78 octane number gasoline of 400° F. end-point.

*Example II*

A catalyst having the approximate composition $100SiO_2:10ZrO_2:5B_2O_3$ is prepared as follows. Hydrated silica in finely divided form is precipitated similarly as in Example I and the finely divided precipitate is filtered and washed with acidulated water to substantially remove alkali metal impurities. The purified hydrated silica is suspended in a dilute solution of zirconyl chloride in an amount suitable to form catalyst of the above composition and hydrated zirconia precipitated in the presence of the suspended hydrated silica by the addition of ammonium hydroxide. The composite precipitate is filtered and washed, and the filter cake dried at a temperature of approximately 200–250° F. The dried material readily breaks up into a very fine powder which is impregnated with tri-amyl borate and is then ignited to yield catalyst containing boric oxide disposed on silica-zirconia.

Catalyst prepared in this manner is mixed to the extent of one per cent by weight with a Mid-Continent gas oil of approximately 32° A. P. I. gravity and heated to a temperature of approximately 1000° F. and directed to a reaction chamber at an average temperature of approximately 800° F. and a pressure of approximately 50 pounds per square inch. A yield of approximately 30 volume per cent of 400° F. end-point gasoline having 77 octane number is obtained in a single pass. The spent catalyst is separated with non-vaporous residue removed from the process. It is then filtered to remove most of the non-vaporous oil residue and ignited at a temperature of approximately 1200° F. in the presence of air. Catalyst regenerated in this manner gives substantially the same yield as above.

I claim as my invention:

1. A process for the catalytic conversion of hydrocarbon oil to produce high antiknock gasoline which comprises cracking said hydrocarbon oil in contact with a cracking catalyst powder comprising essentially a synthetic alkali-free mixture of hydrated silica, hydrated zirconia, and boric acid.

2. A process for the catalytic conversion of hydrocarbon oil to produce high antiknock gasoline which comprises cracking said hydrocarbon oil in contact with a cracking catalyst powder comprising essentially a synthetic alkali-free mixture of hydrated silica, hydrated alumina, hydrated zirconia, and boric oxide.

3. A process for the catalytic conversion of hydrocarbon oil to produce high antiknock gasoline which comprises cracking said hydrocarbon oil in contact with a catalyst powder suspended therein prepared by precipitating hydrated silica in powdery form, precipitating hydrated alumina and hydrated zirconia upon said hydrated silica powder to form a silica-alumina zirconia composite and impregnating said composite with boric oxide.

4. A process for the catalytic conversion of hydrocarbon oil to produce high antiknock gasoline which comprises cracking said hydrocarbon oil in contact with a catalyst powder suspended therein prepared by precipitating hydrated silica in powdery form, precipitating hydrated zirconia upon said hydrated silica powder to form a silica-zirconia composite and impregnating said silica-zirconia composite with boric oxide.

5. A process for the catalytic conversion of hydrocarbon oil to produce high antiknock gasoline which comprises cracking said hydrocarbon oil in contact with a catalyst powder suspended therein prepared by precipitating hydrated silica in powdery form precipitating hydrated alumina and hydrated zirconia in the presence of said hydrated silica powder, drying and impregnating said dried material with boric oxide.

6. A process for the catalytic conversion of hydrocarbon oil to produce high antiknock gasoline which comprises cracking said hydrocarbon oil in contact with a catalyst powder suspended therein prepared by precipitating hydrated silica in powdery form precipitating hydrated zirconia in the presence of said hydrated silica powder, drying and impregnating said dried material with boric oxide.

7. A process for the conversion of hydrocarbon oil which comprises subjecting said oil to conversion at conversion conditions of temperature, pressure and time in the presence of a catalyst comprising hydrated silica, hydrated zirconia and boric oxide.

8. The process of claim 7 further characterized in that said catalyst contains hydrated alumina.

JOSEPH D. DANFORTH.